July 3, 1962   D. D. GEER   3,041,710
ARTICLE AND METHOD OF JOINING VITREOUS MATERIAL
Filed June 5, 1957
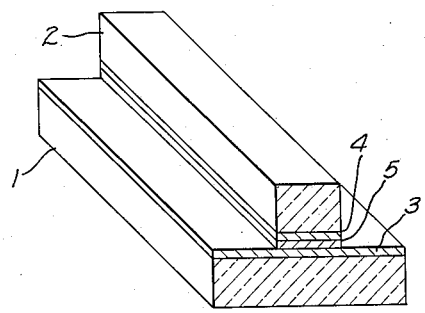
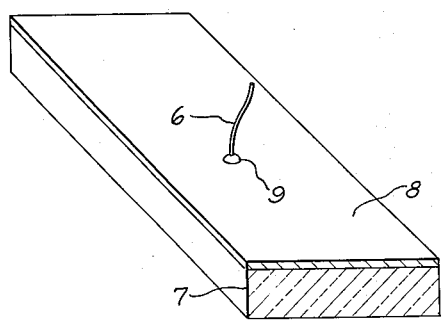
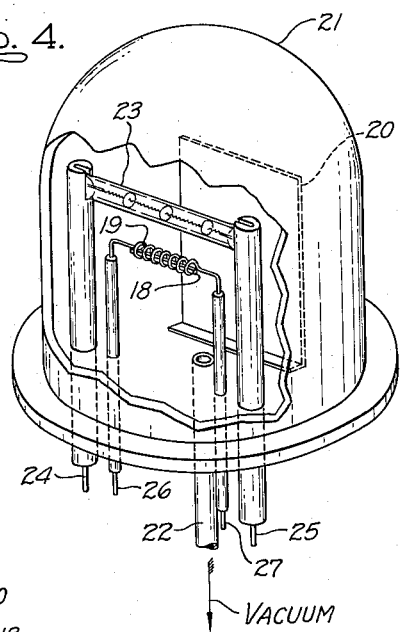
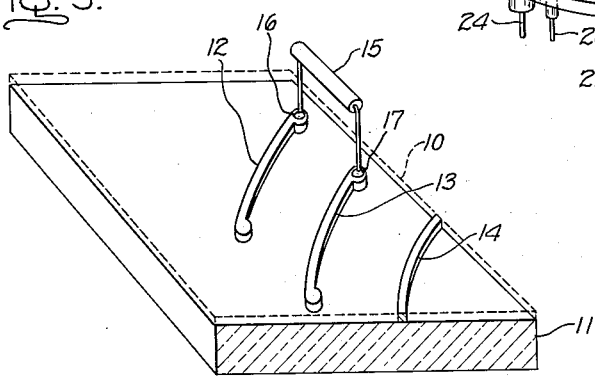
Inventor:
Donald D. Geer,
by Andrew J. Booz
His Attorney.

United States Patent Office 3,041,710
Patented July 3, 1962

3,041,710
ARTICLE AND METHOD OF JOINING VITREOUS MATERIAL
Donald D. Geer, Cleveland, Ohio, assignor to General Electric Company, a corporation of New York
Filed June 5, 1957, Ser. No. 663,654
4 Claims. (Cl. 29—195)

My invention relates to a method of joining vitreous material to itself or to articles of different composition and to the articles so joined. More particularly it relates to a method of coating a vitreous surface with a material such that another vitreous surface may be joined thereto, or, alternatively, other articles soldered to the coated surface.

A method of joining a coated vitreous article to an article of the same vitreous type, or to an article of a different vitreous type, or to a metal, by the conventional metal soft soldering process has considerable use in the art. For example, it may be used to join glass parts or components together or to form an electrically conductive printed circuit on a glass plate. Prior practice in this type of joining, such as the use of titanium hydride, has required the titanium hydrided piece to be heated to approximately 900° C. in a vacuum in order to decompose the hydride and suitably wet or "tin" the surface to be joined. This is unsuitable for lime or soft glass, which has a softening temperature of about 600° C. to about 700° C.; and in many cases it would be unsuitable for borosilicate or hard glass, which generally has a softening temperature in the range of approximately 700° C. to 850° C. The method herein described and claimed is therefore not only particularly adapted for use with soft glass, but also has application with hard glass.

It is an object of my invention to provide an improved method for joining together vitreous materials.

Another object of my invention is to provide an improved method of joining articles of soft glass to other glass or metallic articles.

Another object of my invention is to provide a coated glass article to which another article may be soldered.

Briefly stated, a coating of copper-aluminum-iron alloy is deposited on a vitreous surface, and this coating can be soldered to with conventional soft metallic solder. The alloy is vaporized on the heated vitreous surface in a vaccum, and at a temperature below the temperature at which the vitreous surface softens thereby producing a solderable coating on the surface. The vaporized metal produces a coating having permanence on glass or other vitreous surfaces in the presence of heat. It does not diffuse or "burn out" when the coated article is heated to about 800° C. for short periods of time. Furthermore, it produces a coating having good electrical conductivity.

Further objects and advantages of my invention will become apparent as the following description proceeds and the features of novelty which characterize my invention will be pointed out with particularity in the claims annexed to and forming a part of this specification. The nature of the invention will best be understood when described in connection with the accompanying drawings, in which:

FIG. 1 illustrates two pieces of vitreous material such as glass soldered together according to the present invention;

FIG. 2 illustrates a wire soldered to a conductive coating applied to a vitreous surface according to this invention;

FIG. 3 illustrates an electrical device soldered to an electrical circuit "printed" on a vitreous surface according to the present invention; and FIG. 4 illustrates a vaporizing apparatus with which the vaporized alloy may be deposited on the glass surface.

Referring to FIG. 1, two pieces of vitreous material such as glass 1, 2 each have a coating of vaporized metal 3, 4 applied thereto as will be hereinafter described. The metal coatings may be joined together by use of a conventional soft soldering process using a deposit 5 of metallic solder between the vaporized coatings 3 and 4.

The coating metal is an alloy having substantially 6 to 11.2% aluminum, 1.5 to 4.5% iron, and the balance essentially copper. Two commercially available alloys are satisfactory. One is known commercially as Ampco Grade 6 and is produced by Ampco Metal, Inc., Milwaukee, Wisconsin. An analysis of this alloy indicates that it has 6 to 8% aluminum, 1.5 to 3% iron and the balance substantially copper, with about 0.5% of other substances. Another commercially available alloy which is satisfactory is known as Ampco Grade 18 and it is also produced by Ampco Metal, Inc., Milwaukee, Wisconsin. It contains 10 to 11.2% aluminum, 3 to 4.25% iron, and the balance is substantially copper, with about 0.5% other material.

The vaporizing apparatus of FIG. 4 may be used to apply the metallic coating on the vitreous or glass surface. A small metal turning 18 of the coating alloy is placed on a vaporizing coil 19, preferably of tungsten. The vaporizing coil is in close proximity with the glass article 20 to be coated. If desired, parts of the glass article may be masked leaving exposed only those portions of the article which are to be coated. The surface of the article 20 to be coated and the vaporizing coil 19 are in an airtight enclosure 21. The air around the glass article 20 and the coil 19 is evacuated through the vacuum line 22 so as to produce a vacuum of approximately 20 microns of mercury. A quartz heat lamp 23 is electrically connected to leads 24 and 25 which pass through air-tight openings in the enclosure 21. The surface to be coated is heated by the quartz heat lamp 23 to above 250° C. but kept below the softening temperature of the vitreous surface. Temperatures ranging between 280° C. and 300° C. appear to be satisfactory. There appears to be no particular advantage in heating the surface to above 300° C. The coating metal may then be vaporized by passing an electric current through the coil which is electrically connected to leads 26 and 27 which pass through air-tight openings in the enclosure 21, heating the coil to incandescence, and vaporizing the alloy. The vaporized metal will be deposited on the heated glass surfaces. The metallic coating thus applied should be adequately cooled before exposure to the atmosphere so as to prevent oxidation with the atmosphere. It may be permitted to cool normally, or more rapid cooling may be accomplished by passing cooling air against the outside or exposed portions of the glass article and/or passing an inert gas, such as nitrogen, along the coated surfaces of the glass article.

After the glass or vitreous materials have been coated according to this process they may be joined by use of the conventional soft soldering process using a metallic solder 5. The glasses 1, 2 which have been joined may be of the same glass type, or they may be of different types of glass, such as the above mentioned hard and soft glasses.

FIG. 2 illustrates the joining of a wire 6 to a piece of glass 7 on which has been deposited a vaporized coating 8 as explained above. The wire 6 may be joined to the coating 8 by means of conventional soft solder 9.

To form a "printed" circuit on a piece of glass insulation, a coating as illustrated by the dotted line 10 in FIG. 3, may be deposited on a glass surface 11 by the vaporization process described above. The coating metal may be removed where desired by chemical dissolving of the metal in the usual sulphuric-chromic acid type of a mixture if the coating is not permitted to age for any appreciable time (say several hours) after it has been coated. This will leave electrically conductive circuits 12, 13, 14 on the glass surface. Any electrical device, for example, a condenser 15, may be joined to the electrically conductive circuits by conventional soft metallic solder 16, 17. A circuit of this type may be useful in what has become known as a "printed" circuit used in electronic equipment.

If it is desired to chemically dissolve portions of the coating metal from the glass surface, care should be taken that the coating is not heated in air to above about 100° C., or that the coating is not left standing in air for any appreciable time, as this will result in the coating becoming extremely resistant to attack by the dissolving solution.

However, as explained above, such a "printed" circuit may also be produced by masking the glass before coating leaving exposed only the portions of the glass which are to be coated.

While I have described only certain preferred embodiments of my invention by way of illustration, many modifications may occur to those skilled in the art. I, therefore, wish to have it understood that I intend in the appended claims to cover all such modifications as fall within the true spirit and scope of my invention.

What I claim as new and desire to secure by Letters Patent of the United States is:

1. The method of joining a meal surfaced member to a glass member which comprises preliminarily metallizing a surface of the glass member by vaporizing, in a vacuum, a quantity of alloy comprising approximately 6–11% aluminum, 1.5–4.5% iron and the balance essentially copper, collecting vapor of said alloy on the surface of said glass member while maintaining the said surface in said vacuum at a temperature above about 250° C. and below the softening temperature of the glass member to form an adherent coating of the alloy on said surface, and subsequently joining said metal surfaced member to the coated surface of said glass member by application of molten metallic soft solder thereto.

2. The method of joining together glass members which comprises preliminarily metallizing a surface of each glass member by vaporizing, in a vacuum, a quantity of alloy comprising approximately 6–11% aluminum, 1.5–4.5% iron and the balance essentially copper, collecting vapor of said alloy on the surface of each glass member while maintaining the said surface in said vacuum at a temperature above about 250° C. and below the softening temperature of the glass member to form an adherent coating of the alloy on said surface, and subsequently joining the said members at the coated surfaces thereof by application of molten metallic soft solder thereto.

3. In combination, a glass member having on a surface thereof an adherent vapor deposited coating of an alloy comprising approximately 6–11% aluminum, 1.5–4.5% iron and the balance essentially copper, a metal surfaced member, and a metallic soft solder joining the metal surfaced member to the coated surface of said glass member.

4. In combination, a plurality of glass members each having on a surface thereof an adherent vapor deposited coating of an alloy comprising approximately 6–11% aluminum, 1.5–4.5% iron and the balance essentially copper, and a metallic soft solder joining together the coated surfaces of said glass members.

References Cited in the file of this patent

UNITED STATES PATENTS

| | | |
|---|---|---|
| 1,441,686 | Jones | Jan. 9, 1923 |
| 1,544,148 | Gouverneur | June 20, 1925 |
| 2,048,276 | Marlies | July 21, 1936 |
| 2,130,879 | Dopke | Sept. 30, 1938 |
| 2,163,407 | Pulfrich | June 20, 1939 |
| 2,320,676 | Swift | June 1, 1943 |
| 2,454,270 | Braunsdorf | Nov. 23, 1948 |
| 2,599,751 | Federspiel | June 10, 1952 |
| 2,686,958 | Eber | Aug. 24, 1954 |
| 2,724,892 | Knochel | Nov. 29, 1955 |
| 2,762,725 | Saunders | Mar. 14, 1956 |
| 2,780,561 | La Forge | Feb. 5, 1957 |